United States Patent
Achlioptas et al.

(10) Patent No.: US 7,668,957 B2
(45) Date of Patent: Feb. 23, 2010

(54) PARTITIONING SOCIAL NETWORKS

(75) Inventors: Dimitris Achlioptas, Seattle, WA (US); Frank D McSherry, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 1292 days.

(21) Appl. No.: 10/882,020

(22) Filed: Jun. 30, 2004

(65) Prior Publication Data
US 2006/0015588 A1   Jan. 19, 2006

(51) Int. Cl.
G06F 15/16   (2006.01)
G06F 15/173  (2006.01)

(52) U.S. Cl. .................. 709/226; 709/203; 709/207; 709/223; 709/224

(58) Field of Classification Search ............... 709/203, 709/223, 224, 226, 227, 228, 231
See application file for complete search history.

(56) References Cited

U.S. PATENT DOCUMENTS

| | | | |
|---|---|---|---|
| 5,627,766 | A | 5/1997 | Beaven et al. |
| 6,411,966 | B1 | 6/2002 | Kwan et al. |
| 6,507,844 | B1 | 1/2003 | Leymann et al. |
| 6,766,374 | B2 * | 7/2004 | Trovato et al. ............... 709/227 |
| 7,185,076 | B1 * | 2/2007 | Novaes et al. ............... 709/223 |
| 7,478,078 | B2 * | 1/2009 | Lunt et al. ....................... 707/1 |
| 2002/0010783 | A1 * | 1/2002 | Primak et al. ............... 709/228 |
| 2002/0120744 | A1 * | 8/2002 | Chellis et al. ............... 709/226 |
| 2002/0133611 | A1 * | 9/2002 | Gorsuch et al. ............. 709/231 |
| 2002/0161896 | A1 * | 10/2002 | Wen et al. .................... 709/227 |
| 2002/0174234 | A1 * | 11/2002 | Trovato et al. ............... 709/227 |
| 2004/0041836 | A1 | 3/2004 | Zaner et al. |

OTHER PUBLICATIONS

Tapas K. Das, et al., NetEffect: A Network Architecture for Large-scale Multi-user Virtual Worlds, ACM VRST '97, 1997, pp. 157-163, ACM, Lausanne, Switzerland.
Sean Rooney, et al., Automatic VLAN Creation Based on On-line Measurement, ACM SIGCOMM Computer Communication Review, 1999, pp. 50-57, ACM.
Harold E. Livings, et al., A Heuristic Teleprocessing Network Design Technique, Symposium on the Simulation of Computer Systems IV, 1976, pp. 71-82, IEEE.

(Continued)

Primary Examiner—Quang N. Nguyen
(74) Attorney, Agent, or Firm—Lee & Hayes, PLLC

(57) ABSTRACT

The present invention provides a unique system and method that facilitates reducing network traffic between a plurality of servers located on a social-based network. The system and method involve identifying a plurality of vertices or service users on the network with respect to their server or network locations. The vertices' contacts or connections can be located or determined as well. In order to minimize communication traffic, the vertices and their connections with respect to their respective server locations can be analyzed to determine whether at least a subset of nodes should be moved or relocated to another server to facilitate mitigating network traffic while balancing user load among the various servers or parts of the network. Thus, an underlying social network can be effectively partitioned. In addition, the network can be parsed into a collection of nested layers, whereby each successively less dense layer can be partitioned with respect to the previous (partitioned) more dense layer.

7 Claims, 6 Drawing Sheets

OTHER PUBLICATIONS

Lili Qiu, et al., On Selfish Routing in Internet-Like Environments, SIGCOMM '03, 2003, pp. 151-162, ACM, Karlsruhe, Germany.

Anukool Lakhina, et al., Structural Analysis of Network Traffic Flows, SIGMETRICS/Performance '04, Jun. 12-16 2004, pp. 61-72, ACM, New York, NY.

ParMETIS: Parallel Graph Partitioning & Sparse Matrix Ordering, http://www-users.cs.umn.edu/~karypis/metis/parmetis/index.html, Aug. 2003, 1 page.

George Karypis, et al., A Fast and High Quality Multilevel Scheme for Partitioning Irregular Graphs, 1998, pp. 1-28.

George Karypis, et al., Analysis of Multilevel Graph Partitioning, 1998, pp. 1-18.

George Karypis, et al., A Parallel Algorithm for Multilevel Graph Partitioning and Sparse Matrix Ordering, 1998, pp. 1-21.

George Karypis, et al., Multilevel k-way Partitioning Scheme for Irregular Graphs, 1998, pp. 1-25.

George Karypis, et al., Parallel Multilevel k-way Partitioning Scheme for Irregular Graphs, 1998, pp. 1-23.

George Karypis, et al., A Coarse-Grain Parallel Formulation of Multilevel k-way Graph Partitioning Algorithm, 1997, pp. 1-12.

George Karypis, et al., Multilevel Hypergraph Partitioning: Applications in VLSI Domain, 1998, pp. 1-25.

Kirk Schloegel, et al., Multilevel Diffusion Schemes for Repartitioning of Adaptive Meshes, 1997, pp. 1-20.

Kirk Schloegel, et al., *A Performance Study of Diffusive* vs, *Remapped Load-Balancing Schemes*, 1998, pp. 1-12.

George Karypis, et al., Multilevel Algorithms for Multi-Constraint Graph Partitioning, 1998, pp. 1-25.

Kirk Schloegel, et al., Wavefront Diffusion and LMSR: Algorithms for Dynamic Repartitioning of Adaptive Meshes, 1998, pp. 1-26.

George Karypis, et al., Multilevel k-way Hypergraph Partitioning, 1998, pp. 1-15.

Kirk Schloegel, et al., A New Algorithm for Multi-objective Graph Partitioning, 1999, pp. 1-10.

Kirk Schloegel, et al., Parallel Multilevel Algorithms for Multi-Constraint Graph Partitioning, 1999, pp. 1-21.

George Karypis, Multilevel Algorithms for Multi-Constraint Hypergraph Partitioning, 1999, pp. 1-10.

Kirk Schloegel, et al., Graph Partitioning for High Performance Scientific Simulations, 1999, pp. 1-39.

Kirk Schloegel, et al., A Unified Algorithm for Load-balancing Adaptive Scientific Simulations, 2000, pp. 1-11.

Irene Moulitsas, et al., Multilevel Algorithms for Generating Coarse Grids for Multigrid Methods, SC2001, 2001, pp. 1-10.

George Karypis, Multilevel Hypergraph Partitioning, 2002, pp. 1-30.

Cristinel Ababei, et al., Multi-objective Circuit Partitioning for Cutsize and Path-Based Delay Minimization, ICCAD 2002, 2002, 5 pages.

Navaratnasothie Selvakkumaran, et al., Perimeter-Degree: A Priori Metric for Directly Measuring and Homogenizing Interconnection Complexity in Multilevel Placement, SLIP '03, 2003, 8 pages, ACM, Monterey CA.

Navaratnasothie Selvakkumaran, et al., Multi-Objective Hypergraph Partitioning Algorithms for Cut and Maximum Subdomain Degree Minimization, ICCAD 2003, 2003, 8 pages.

George Karypis, Multi-Constraint Mesh Partitioning for Contact/Impact Computations, 2003, pp. 1-14.

Navaratnasothie Selvakkumaran, et al., THETO—A Fast and High-Quality Partitioning Driven Global Placer, 2003, 6 pages.

Navaratnasothie Selvakkumaran, et al., Multi-Resource Aware Partitioning Algorithms for FPGAs with Heterogeneous Resources, 2003, 6 pages.

Kirk Schloegel, et al., Parallel Multilevel Diffusion Algorithms for Repartitioning of Adaptive Meshes, 1997, pp. 1-9.

* cited by examiner

PARTITIONING SOCIAL NETWORKS

TECHNICAL FIELD

The present invention relates generally to partitioning networks and in particular, to partitioning a social network to minimize a number of servers accessed by any one cluster of associated individuals.

BACKGROUND OF THE INVENTION

Computers were developed to aid people with repetitive tasks that were deemed to be extremely time consuming. Most of the early computers were used for complex mathematical problem solving. The first computing machines were extremely large compared to computers utilized today. Despite their enormous size, the early machines had vastly less computing power than today's machines. Generally speaking, the sizes of computing devices were driven by the sizes of the existing electronic components of that era. This meant that only large research facilities or big businesses could employ computing machines. As new technology allowed for smaller electronic devices to be developed, computing devices also diminished in size. Although still lacking in power by today's standards, the size of the computing machine was reduced enough that it could be placed on a typical desk. Thus, the "desktop computer" was born. This allowed users to have computing technology available in locations other than a central computing building. People found that having the capability to utilize computing technology at their work desk, rather than submitting computing problems to a central location, made them much more productive at their jobs. Eventually, the idea of moving the desktop computer to the home environment to provide even more convenience for doing work became a reality.

When the computer was brought into the home, it became obvious that there were other uses for it besides work. This allowed people to view the computer as not only a work tool, but also as a helpful device that could be used to play games, aid in learning, handle telecommunications for the home, and even control home appliances and lighting, for example. Generally speaking, however, a user was restricted to computing information available only on that computer. A game could be installed on the desktop computer and played on that computer, but one could not play others who had computers at other locations. Technology came to the rescue with a first attempt at connecting these computers utilizing telephonic modem technology. This permitted individual users to connect via direct dial-up telephone connections. This was great for local telephone calls, but enormously expensive for long distance calls. However, with the advent of the Internet, all that has changed. It provides an inexpensive means to connect computers from all over the world. This allows users to quickly and easily transmit and receive information on a global scale. Businesses fully embraced this new technology, creating "e-commerce." Using the current technology, users can send and receive information and even buy products and services online.

In addition to promoting and increasing the exchange of goods or services, the Internet has also fostered social relationships. Communicating by electronic mail (e-mail) soon became a primary means of written contact. However, much has changed since the advent of the Internet. Online chat programs, phone calls, as well as instant messaging have increased in popularity and use as a means of contacting friends, acquaintances, work colleagues, and friends of friends as well as a means of meeting or seeking new friends, dating, party planning, and the like for thousands, if not millions, of people.

In the process of providing services that connect users to one another such as email, for example, a service provider can capture an underlying social network associated therewith. Moreover, "social networks" are by now acquiring "digital representations". For example, in the case of instant messaging there is an underlying social network which the service provider captures in order to provide their services. Instant messaging also involves the notions of "buddies" and "presence alerts", for instance, which facilitate the communication process between account users. However, in the more popular applications which often involve hundreds of millions of users, the underlying social network is too big to be serviceable by a single server and thus must be spread among a large number of servers.

In order to sustain the massive number of online service account users, several hundred servers per service provider are typically employed to handle the users as they log on and off the network. The allocation of users to servers is conventionally performed by using an algorithm known as a "hash function" which takes as input the user ID and outputs a server number. The key properties of the algorithm are that:
  It does not require memory and thus is extremely fast to compute;
  It effectively behaves in a random-like manner and thus does a good job in terms of distributing the users onto the hosts in a "balanced" way, i.e., making sure that no host receives too many users.

The fact that this technique does not require remembering any information is one of the main reasons that it has been so widely adopted. In other words, any entity in the system that wants to know "which server is hosting this user?" does not need to go and look it up anywhere. Instead, given the user ID, it can run the hash function/algorithm and figure it out.

Unfortunately, conventional mechanisms including the hash function can be problematic because they do not consider user relationships between or among other users when allocating the users to servers. At best, the hash function, for instance, operates in a random-like manner when assigning users to servers. This can result in an excessive amount of network traffic between servers in order to pass data between "related" users. For example, in the case of the instant messaging, the types of data can include communications of alerts, messages, data sharing, etc. As the number of servers to accommodate the masses of users increases, the network traffic can be undesirably high, resulting in slower data transfers between servers and between users.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to a system and methodology that facilitate optimizing user placement with respect to their associated "friends" on any given social-based network. In particular, the invention provides for partitioning the network so as to minimize the number of edges across parts. In the case of social networks, this means that "related" users (e.g., users who know of or know each other in some way or another) can be clustered and distributed among fewer servers, thereby mitigating overall network traffic and enhancing service performance.

The clustering of "related" or "connected" users (e.g., users which are connected to each other due to some relationship such as friend, colleague, relative, etc.) can be accomplished without any knowledge of metadata or latent factors associated with each user. Service providers can readily obtain or generate a social network graph by monitoring the frequency of interactions between its users. By simply examining a social network graph of users without additional information about each user (e.g., location, age, gender, ethnic, IP address, etc.), the network can be partitioned by clustering connected users based on peer-wise connectedness information. In practice, for instance, imagine a user U has two friends P and Q listed on his frequent contact list. Friend P can be associated with user U using an algorithmic determination, and then connected to and/or moved to the same server as user U. Alternatively, user U can be moved to another server where most of his contacts are connected to as well. Friend Q may be treated in a similar manner to effect a reduction in traffic throughout the network. In fact, any amount of clustering on such a large scale can provide a substantial decrease in server to server communication on the network.

The partitioning or user-migration process of a social network involves examining a user's contacts or connections at a particular time for substantially all users and then determining whether each respective user should be moved to another server based in part on the location of their contacts. In particular, imagine that user B has several contacts or connections with other users across many machines. For example, user B has 1 connection on or with machine 1 and 5 connections with machine 7, and so on. Once the locations of the user's connections are determined, it can assess whether the user should be moved to another server in an effort to minimize network traffic. Various considerations such as minimizing network traffic and maintaining a balanced distribution of users per server can be weighed before moving a particular user.

Another aspect of the invention relates to a stratification process which involves defining sub-layers or strata of a social network. The migration or partitioning process can be applied to one or more defined strata in an order based on the density of each stratum. For example, the most inner or densest strata can be partitioned first. Following, the next densest layer can be partitioned, while holding the placement of the users in the previously partitioned strata intact . . . and so on. More specifically, the stratification process involves ascertaining a k-core, where k is equal to a certain, chosen number of contacts or connections. In particular, a network graph can be separated into a number of layers. The layers can be defined in terms of some number of contacts. Connected users who meet the "qualifications" of each layer can be successively removed from the network until the k-core is reached. The k-core of a network is the potentially empty sub-network that results from repeatedly removing any vertices of a degree less than k, where the degree refers to a number of connections that any user has at a current time. This process can also be referred to as defining a sequence of layers of people, where successive layers represent increasingly connected sub-networks. Thus, the stratification process facilitates prioritizing which subparts of a social network (graph) will be partitioned first, second, etc. or not at all.

As described in the previous paragraphs, the migration process of determining whether to move any one user from one server or machine to another can be applied to a static social network graph. That is, an underlying social network is obtained and represented as a graph in a static state and is not affected by the logging on or off of users. However, the migration process can be performed dynamically as users log on and/or off to further optimize network service performance.

Moreover, an underlying consideration of the present invention is that the distribution of buddies onto servers corresponds to some allocation that is determined using a very sophisticated operation and which cannot be reproduced by entities that do not know the entire social network. Instead, after the allocation is determined, anyone who needs to know "which server is hosting this user?" must consult the "allocation table" to find the answer. As a result, by coming up with the user allocation (the "partitioning") in a "global knowledge" manner, the invention can facilitate a collocation of buddies or contacts to collocate so that communication is reduced.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
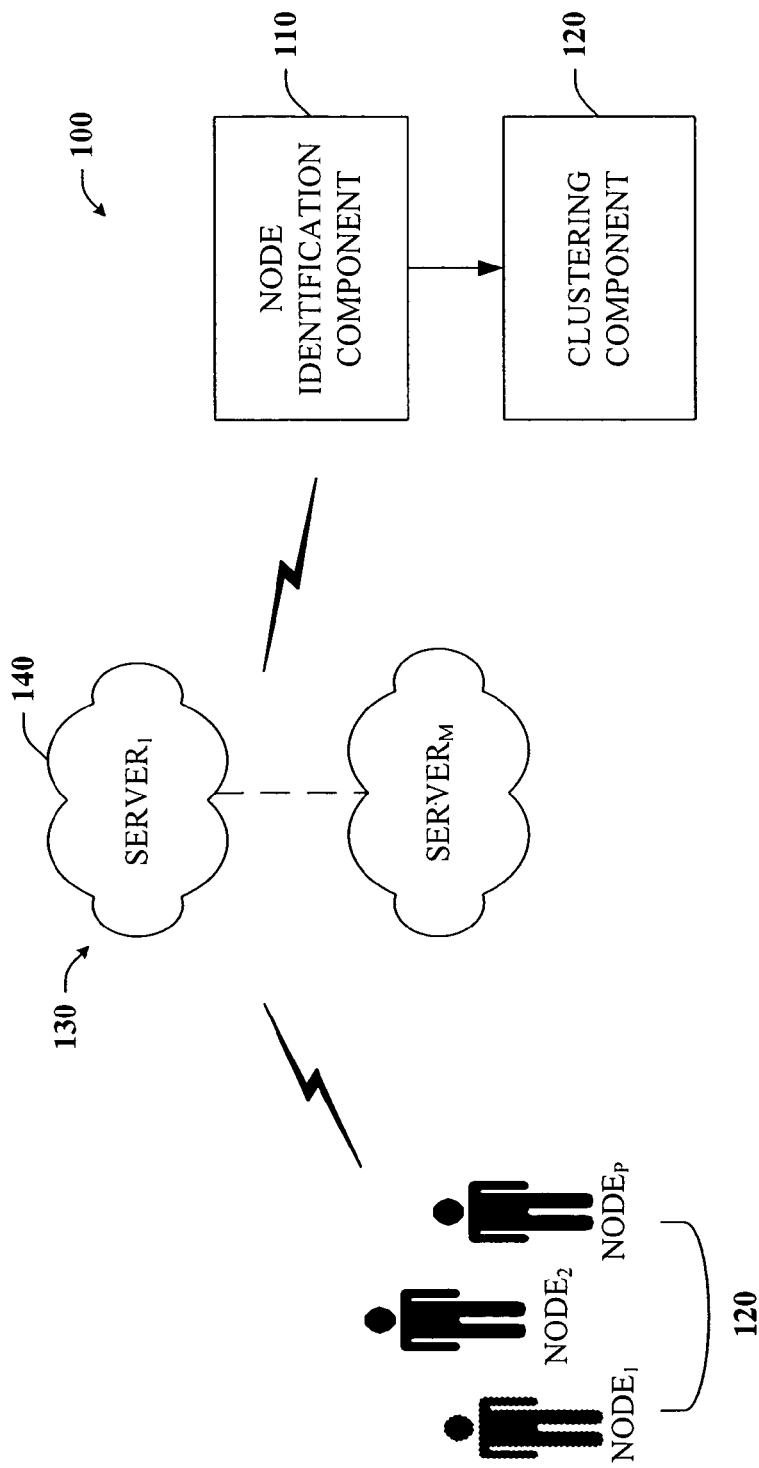
FIG. 1 is a block diagram of a system that facilitates partitioning a social network to mitigate network traffic in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

In addition, the term "friend" as employed in this application is intended to refer to an individual, a group of individuals, and/or an account user who logs on and/or off a network or social network and who have some type of relationship to possibly at least one other person or entity on the network. The term "related" as employed herein is also intended to convey that such individuals are related by some kind of relationship—familial or otherwise such as by a friendship, work colleague, etc.

As also used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Internet service providers (ISPs) typically maintain dozens if not hundreds of servers in order to handle the large number of account users logging on and making use of their networks. Typically, a customer signs on to their account and via a hash function, the network determines which machine or server is responsible for that user. Once that is determined, the user is granted access and can then appear "online". More specifically, a message is sent from the user's designated server to the one or more servers designated for the user's contacts or friends to let them know that the user's status has changed. When the user signs out and is "offline", yet another message can be sent.

This process occurs for each account user every time their status changes. This alone causes an enormous amount of network traffic. Sending user-generated text or voice messages between "connected" users only adds to the network congestion, thereby slowing overall network performance to a greater extent. As more and more user accounts are opened for any given ISP, the internal network traffic may become unsustainable. This is due in part to the hash function employed. The hash function tends to be random but balanced meaning that servers are assigned or designated for users in a manner which essentially balances the number of users on any one server. This means that as the number of servers increases, the probability that any two "friends" will be located on the same machine or server decreases. Hence, an amount of clustering of users can yield substantial improvements in network performance as the number of users increase per network. Clustering of users among servers can be applicable to instant messaging users, email users, chat program users, and the like.

Referring now to FIG. 1, there is a general block diagram of a system 100 that facilitates partitioning a social network in accordance with an aspect of the present invention. The system 100 comprises a node identification component 110 that can identify any number of nodes 120 (e.g., each node is a user or individual: $USER_1$, $USER_2$, ... up to $USER_P$, where P is an integer greater than or equal to one) associated with at least one social network 130 that is managed by a plurality of servers 140 (e.g., $SERVER_1$ to $SERVER_M$, where M is an integer greater than 1). For example, the node identification component 110 can identify that node=1 (e.g., $USER_1$) is located on $SERVER_{21}$. Similarly, the node identification component 110 can identify that node=1 has a connection with node=34 and node=42 (e.g., they are contacts of node=1) on the network, which are both located on $SERVER_{17}$.

Operatively connected to the node identification component 110 is a clustering component 140, which aggregates subsets of nodes 120 associated with a respective social network 130 and dedicates or designates at least one server 140 to the respective subsets of nodes 120. As a result, internal network traffic can be reduced or mitigated. Still referring to the above example, the clustering component 140 can determine that it would be more efficient to relocate or move node=1 to $SERVER_{17}$ if for example, node=1 had fewer contacts on any other server including $SERVER_{21}$.

Various methodologies in accordance with the subject invention will now be described via a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Figure 2:
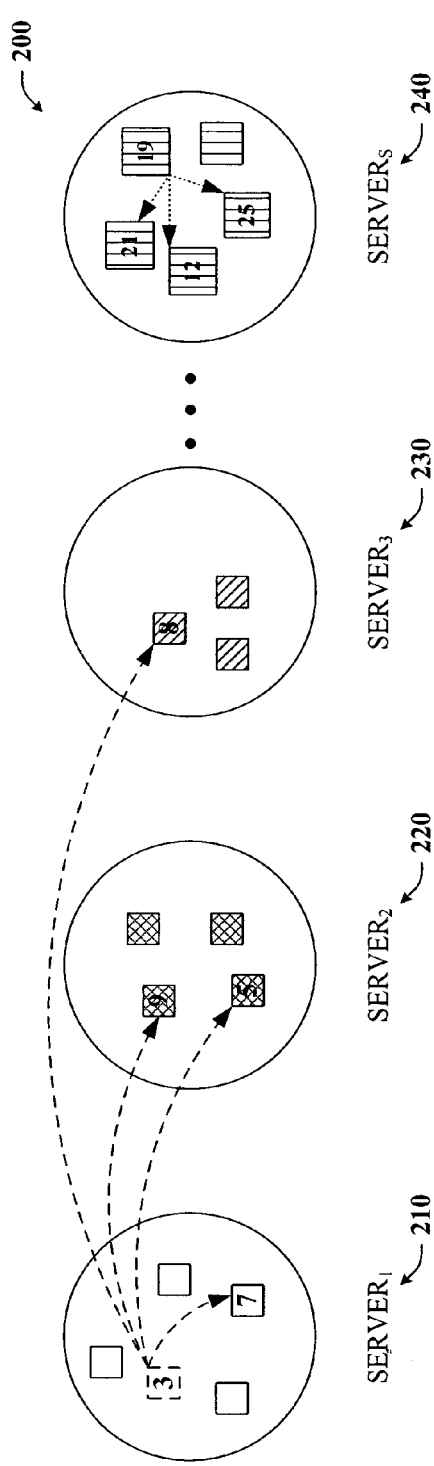
FIG. 2 is a schematic diagram a social network supported by a plurality of servers in accordance with another aspect of the present invention.
Figure 3:
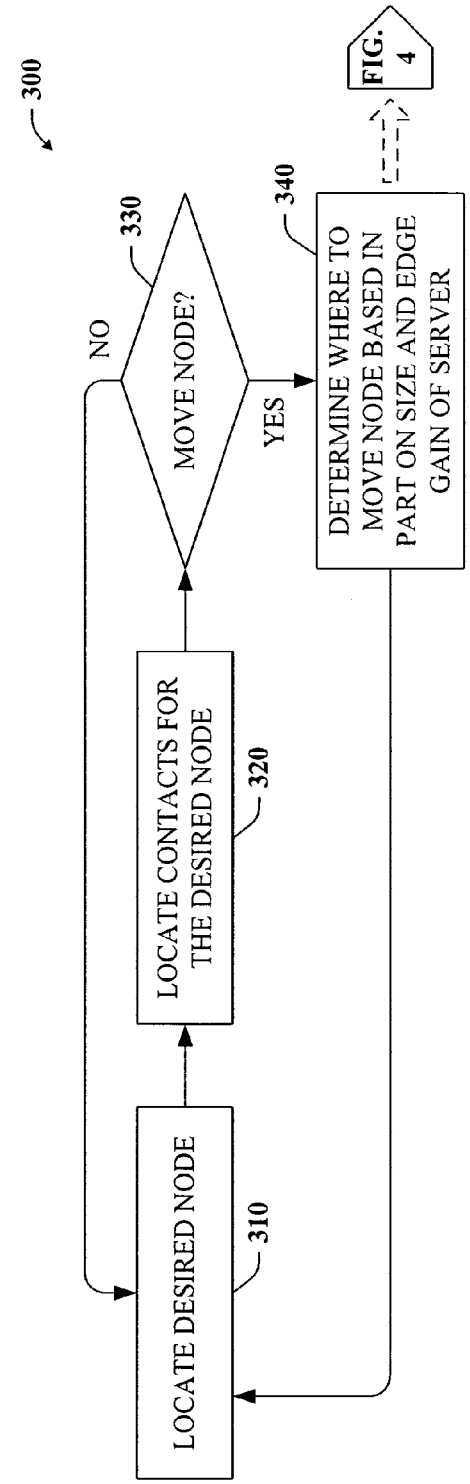
FIG. 3 is a flow diagram of an exemplary process that facilitates partitioning the social network such as shown in FIG. 2 in accordance with yet another aspect of the present invention.

Referring now to FIGS. 2 and 3, there are illustrated a schematic diagram of a social network 200 which corresponds to a flow diagram of a partitioning or migration mechanism 300 in connection with social networks 200. In particular, the network 200 includes a plurality of buckets or servers, whereby each bucket or server can be designated to serve a plurality of account users. For example, $SERVER_1$, 210, $SERVER_2$ 220, $SERVER_3$ 230, and $SERVER_S$ 240 (where S is an integer greater than or equal to one) can respectively maintain a plurality of nodes. Nodes such as node 3 and node 9 in $SERVER_1$ 210 can relate to individuals and/or account users who have connected to the network 200 and thus, randomly, to any one server.

When all pairs of relevant adjacency relationships have been determined, (e.g., when we know the buddies of everybody), partitioning or clustering of the network can be performed. Starting with an arbitrary partition, the network 200 can be iteratively improved by examining nodes one by one (in sequence, i.e. round-robin) and by examining whether we can improve the allocation by moving the current node.

Regarding the initial allocation, anything is reasonable as long as all servers start with roughly the same number of users. This can be achieved by a random partition or, perhaps more illustratively, by saying that the users with the 100,000 smallest IDs go to server 1, users with the next 100,000 user IDs go to server 2, and so on.

Following, the location of each respective node (user) can be determined at 310. This can begin with node 1, for example, assuming that substantially all users on the network individually correlate to some node identifier (e.g., node g, where g is an integer greater than or equal to 1). For instance, node 3 is determined to be located on $SERVER_1$ 210. At 320, contacts associated with node 3 can be located on the network as well. For example, node 3 has "a connection" with node 7 in $SERVER_1$ 210; with nodes 5 and 9 in $SERVER_2$ 220; and node 8 in $SERVER_3$ 230. This means that nodes 7, 5, 9 and 8 are determined to be contacts or buddies of node 3. Similarly node 19 is a contact of nodes 12, 21, and 25, all of which are located on $SERVER_S$ 240.

At 330, it can be determined whether node 3, for instance, should be moved to another server to facilitate reducing traffic between servers. This determination can be made based in part on optimizing a reduction of network traffic along with maintaining a relatively even distribution of users across substantially all servers. In particular, the number of edges and the size (user load) of a first server (e.g., current server connected to node 3) and at least a second server (e.g., proposed recipient server of node 3) can be evaluated at 340. For instance, an edge gain and a size gain can be calculated to facilitate determining whether a user should be moved from one server to another. Further discussion with respect to determining the size and edge gain of the first and second servers can be found in FIGS. 4 and 5, infra.

The process described in FIG. 3 can be repeated for each respective node or user on the network until at least one pass of substantially all nodes has been performed. For example, node 19 is shown to be contacts of nodes 12, 21, and 25 in $SERVER_S$ 240. Thus, node 19 may be determined to stay in its current server 230.

A plurality of passes can be done to further enhance the partitioning effect until a time limit is reached or until the mitigation of internodal traffic lessens and/or levels off after some number of passes have occurred.

Figure 5:
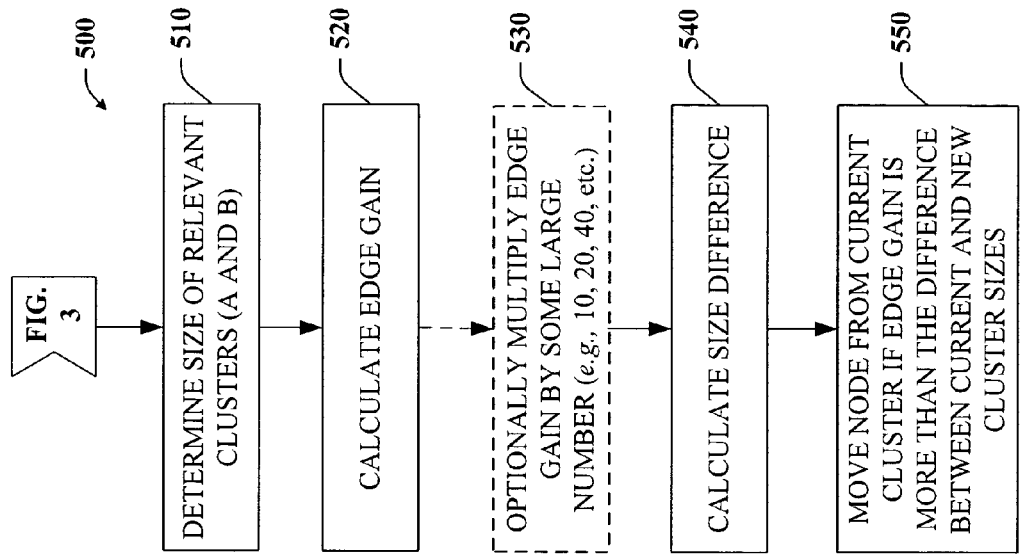
FIG. 5 is a flow diagram of an exemplary process that facilitates making such a determination depicted in FIG. 4 in accordance with an aspect of the present invention.
Figure 4:
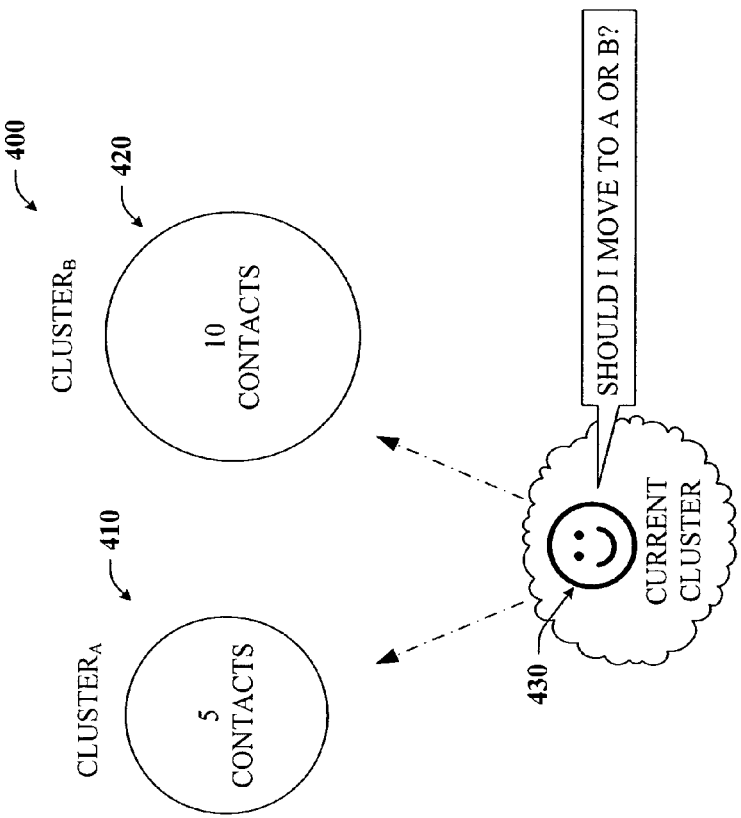
FIG. 4 is a schematic diagram of a determining whether and where a node should be moved to mitigate internal network traffic between servers in accordance with still another aspect of the present invention.

Referring now to FIGS. 4 and 5, there are illustrated a schematic diagram 400 of a first 410 ($CLUSTER_A$) and second cluster 420 ($CLUSTER_B$) that coincide with a flow diagram of an exemplary migration process 500 which facilitates determining whether a node 430 should be relocated from its current cluster or server to another server or cluster and if so, to which one. In particular, should the node 430 be moved to cluster 410 or cluster 420 or remain on its current cluster, given that cluster 410 has 5 contacts "connected" to the node 430 and cluster 420 has 10 contacts associated with the node 430. The current cluster can have 4 contacts in common with the node 430.

At first glance and without performing any sort of computations, it might be concluded to move the node 430 to cluster 420 since it has more contacts there. Moving each person to the server where they have most friends can help minimize the traffic between servers. However, this can be somewhat problematic because if everybody does this then, most likely, everybody will end up in one server, which is a completely undesirable (and practically infeasible) allocation of users to servers.

To mitigate this imbalance, an aspect of the present invention provides that when a move reduces the number of internode edges and that move amounts to moving a vertex from a bigger cluster to a smaller cluster, then the move is made. Thus, it is only when the "proposed recipient" cluster is already "bigger than what would be desirable" that the edge gain can be traded off with this cluster-size increase.

The process 500 can begin with determining a size of the relevant clusters such as first and second clusters at 510. At 520, an edge gain can be calculated by the following:

$$edge_1 - edge_2 = edge\ gain,$$

wherein $edge_1$ refers to the edge quantity in the first cluster under consideration (e.g., current server) and $edge_2$ refers to the edge quantity in the second cluster under consideration (e.g., proposed server to receive the node or proposed recipient cluster).

At 530, the calculated edge gain can be multiplied by a relatively large number such as 10, 20, or 40, for example, in order to amplify the desire to reduce or cut edges of the network graph. More discussion on the rationale behind such amplification will follow below. At 540, a size difference between the first and second clusters can be determined by employing the following:

$$size_1 - size_2 = size\ gain,$$

wherein $size_1$ refers to the overall size of the cluster in terms of the number of nodes present therein.

If and only if the edge gain is greater than the normalized size gain is a node (or user) moved to another cluster or server at 550.

Put another way, imagine that moving a vertex that is currently in cluster 1 to cluster 2 is under consideration. Let $e_1$ be the number of buddies this vertex has on cluster 1 and $e_2$ be the number of buddies it has on cluster 2. Let $s_1$ be the size of cluster 1, which does not include the vertex under consideration. Let $S_2$ be the size of cluster 2. The formula can then be:

$$\text{move the vertex only if } A^*(e_2-e_1) > S_2 - S_1,$$

wherein A is the "amplification" factor mentioned above.

Contrary to traditional views, employment of the amplification factor can be useful in the partitioning process. For instance, one conventional philosophy associated with partitioning in general is that the different parts should be equal in size. Based on this way of thinking then, the node 430 should be moved to the smaller cluster 410. However, consider this: typically, a 1% fluctuation in cluster sizes is tolerable. Thus, if there are 200 million vertices divided into 200 parts (servers or buckets), then each server or bucket can be expected to have about 1 million vertices. However, with the 1% fluctuation, imagine that there is a difference of about 10,000 vertices between a larger server and a smaller server. Thus, the larger server has 1 million vertices and 40 contacts with the node, whereas the smaller server has 990,000 vertices and only 10 contacts with the node.

The difference in size is merely 10,000 (out of 1 million) vertices between each server, which is relatively small— meaning that the two servers are essentially the same size. However, the larger server is about 4 times better with respect to the number of connections common to or associated with the node. Hence, by magnifying the number of vertices or edges within particular servers, it can be more easily determined where to move or where to keep the node 430. The amplification value or factor can be optimized over multiple iterations. In this case, however, since the two clusters are essentially the same size, the server having the most contacts with the node 430 can be selected to receive or keep the node 430, depending on the current location of the node 430.

Due to the potential enormity of a social network graph, the graph can be separated into at least two sub-layers or strata. This can be accomplished by a stratification process which involves determining a k-core. Determining a k-core of a social network for some fixed k identifies a collection of nested strata of people that in the end consists of a core in which every one has at least k neighbors in it. The partitioning algorithm(s) can select a suitable k to yield a dense-sub-graph of the social network, which can then be subjected to partitioning. Once the core is partitioned, a layer immediately before the core layer can be partitioned with respect to the partitioned core, and so on and so on with subsequent layers. Each subsequent layer is less important than its predecessor because the people in it have fewer contacts and are thus less influential with respect to partitioning and to creating and/or reducing traffic. Hence, users who are more influential such as those with a relatively large number of contacts exert more influence earlier in the partitioning of the network.

For instance, let k>0 be a fixed integer (e.g., k=7). Consider the following procedure applied to the input graph:
1. Set current graph=whole network
2. Repeat:
   If there exists a vertex that has fewer than k neighbors in the current graph, pick any such vertex and remove it from the current graph.
   If no such vertex exists in the current graph, stop.

Observe that when the above procedure terminates, either there are no vertices left at all, or a sub-graph has been found of the original graph such that every vertex has at least k neighbors among the vertices in that sub-graph. So, the k-core of a graph G is the unique (potentially empty) sub-graph of G that is left when the above procedure is carried out. It should be appreciated that the end result can or will, in fact, be the same no matter which particular vertex among the possible ones is selected to be removed in each step.

Furthermore, for every graph G, and every integers 0<a<b, if a vertex is in the b-core of G, then it is also in the a-core. So the following can be performed:
   Determine the 1-core of the graph. Take all the vertices not in the 1-core and put them aside into "bucket 1". The remaining vertices (not in bucket 1) represent the 1-core of the graph.
   Now, starting with the 1-core, determine the 2-core. Take all the vertices not in the 2-core and put them aside into "bucket 2". The remaining vertices represent the 2-core of the graph.
   Now, starting with the 2-core, determine the 3-core. Take all the vertices not in the 2-core and put them aside into "bucket 3". The remaining vertices represent the 3-core of the graph.
   Etc.

Thus, this process provides a decomposition of the graph into k "layers" or strata, where k is the largest integer t for which the graph has a non-empty t-core. The extent to which the graph is decomposed can depend on customer preferences and/or the graph itself. That is, the number of strata for which the graph has a non-empty core (inner most or densest layer— e.g., all vertices have at least 10 connections) depends on the underlying social network.

This decomposition can be combined with the migration process from above as follows:
   use our standard algorithm to partition the k-core.
   then use our standard algorithm to partition the (k-1)-core [which includes the k-core], except that in doing so we never move vertices of the k-core, e.g., they stay in whatever server they were assigned in the previous step.
   then use our standard algorithm to partition the (k-2)-core [which includes the (k-1)-core], except that in doing so we never move the vertices of the (k-1)-core, e.g., they stay in whatever bucket they were assigned in the previous step.
   Etc.

Figure 6:
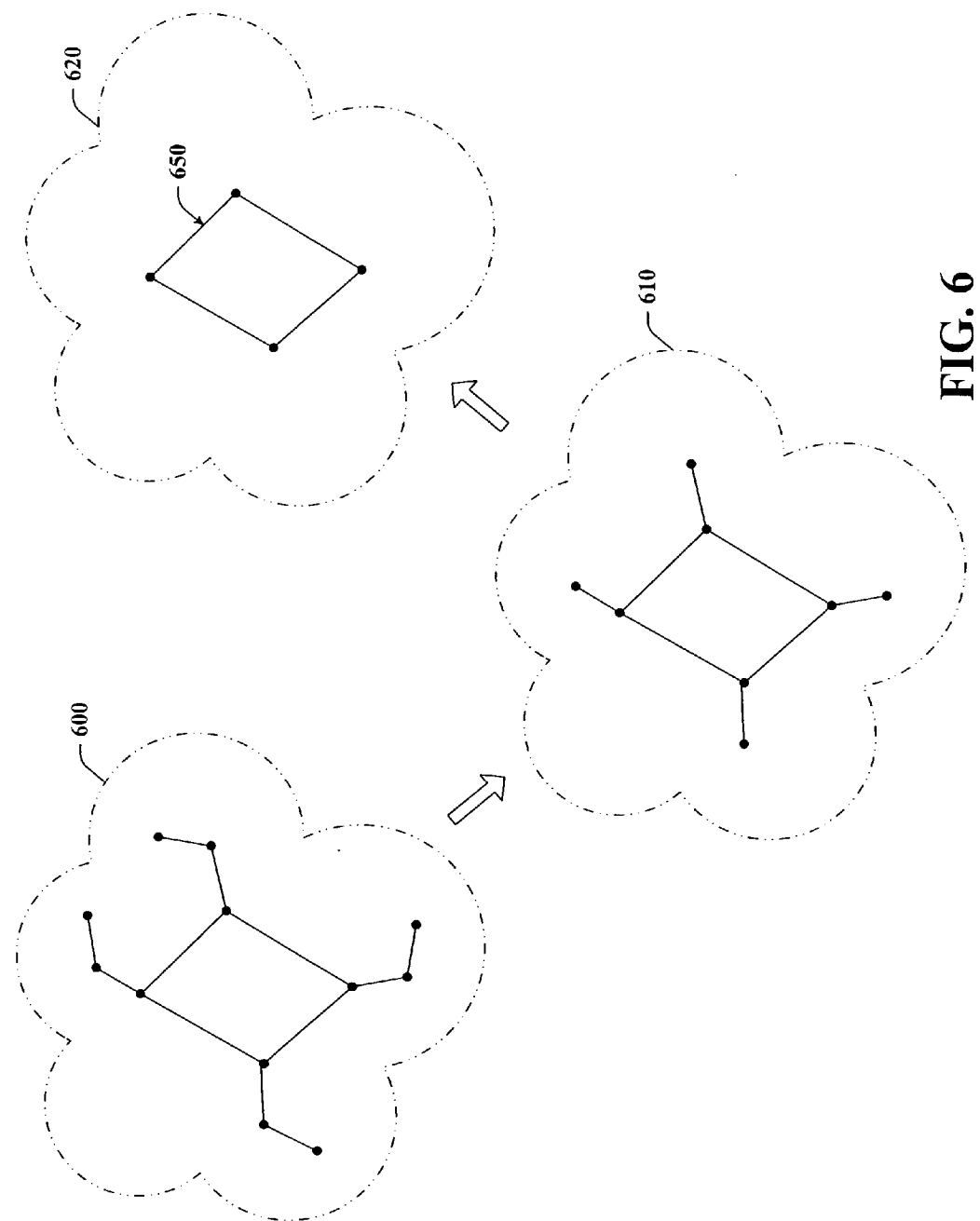
FIG. 6 is a schematic diagram that demonstrates repeated removal of layers of nodes who do not satisfy a k value to facilitate defining a k-core of a social network in accordance with an aspect of the present invention.
Figures 7, 8:
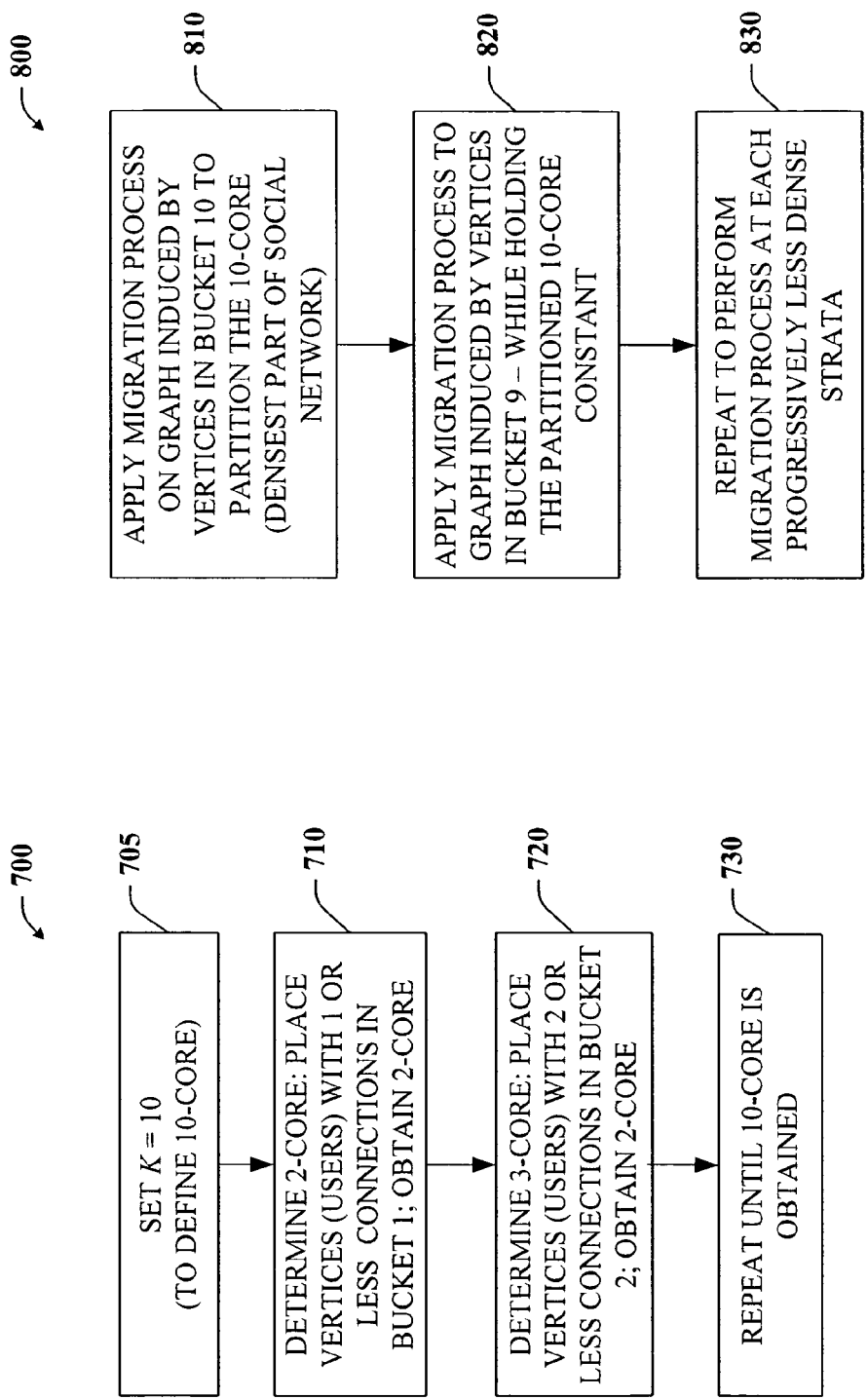
FIG. 7 is a flow diagram of an exemplary methodology that facilitates partitioning a social network in accordance with an aspect of the present invention.
FIG. 8 is a flow diagram of an exemplary methodology that facilitates partitioning a social network in accordance with an aspect of the present invention.

FIGS. 6-8 illustrate the notion of stratifying the underlying social network (graph) and then applying the migration process to a sequence of strata of the graph.

As depicted in FIGS. 6 and 7, for example, imagine that defining 10 strata in the social network graph is desired. To better illustrate the stratification process 700, begin with 10 buckets. For bucket 1, remove all vertices (e.g., users) with 1 or less connections (e.g., buddies, contacts, neighbors, etc.) and place them in bucket 1 at 710. The remaining vertices represent a 2-core of the graph. At 720, remove all vertices with 2 or less connections and place them in bucket 2. The remaining vertices represent a 3-core of the graph. This can be repeated until a 10-core of the graph is determined (at 730). FIG. 6 demonstrates the stratification process 700 via the progression from graph 600 to graph 610 to graph 620 and so on.

It should be understood that any number of strata can be defined depending on the desired amount of stratification. For example, it is possible that a 20-core of the graph could be defined depending on whether any of the vertices having more than 20 connections are left in the graph after "filling" buckets 1-19. In other words, the highest number of strata in any social network is not readily discernible without performing the stratification process.

Turning now to FIG. 8, there is illustrated a flow diagram of an exemplary migration process 800 as (sequentially) applied to the strata defined in FIG. 7. In particular, at 810, the migration process can be applied to the graph induced by the vertices in bucket 10 to facilitate partitioning the 10-core of the graph: the densest part of the social network. At 820, the migration process can then be applied to the graph induced by the vertices placed in bucket 9—while holding the previous partitioned strata constant. At 830, the migration process can be repeated for progressively less dense strata (e.g., graph induced by vertices placed in bucket 8 while holding previous partitioned strata (9 and 10) constant).

The invention as described hereinabove presents a unique and viable mechanism for partitioning an underlying social network regardless of size to substantially reduce network traffic. Contrary to conventional techniques, the partitioning process efficiently coordinates the performance of both disk and RAM operations and, in general, can be accomplished with relative ease and within a reasonable amount of time depending on the size of the social network.

In general, graphs (models of networks) of very large size do not fit in the main memory (RAM) of a computer. Instead, they have to be stored on disk (which can be thought of as a very long tape) by storing the neighbors of each vertex sequentially:
   Vertex ID, neighbor ID(s);
   Vertex ID, neighbor ID(s);
   . . .
   Vertex ID, neighbor ID(s).

According to conventional partitioning techniques, partitioning is commonly accomplished by performing neighborhood searches of arbitrarily selected users to determine the users' frequent contacts (neighbors). Unfortunately, the performance of such searches on disk and disk scanning in this manner are usually quite problematic. For instance, when performing a neighborhood search of a vertex to find its neighbors, the search must be conducted using a disk drive system (e.g., the operation "find all the vertices adjacent to vertex x", where x is an arbitrary vertex). Thus, the cost can be assumed to be relatively high because disk operations are performed mechanically with each search consuming milliseconds of time—as opposed to the nanosecond-range read time of data stored in RAM. In addition, performing a neighborhood search of an arbitrarily selected vertex can require a fair amount of jumping around, thus consuming a greater amount of time for each arbitrary search. By way of example, the operation "who are the neighbors of vertex 2756?" yields a virtually immediate result in RAM, but on disk takes several times longer.

Despite commonly held beliefs regarding graphs of extremely large dimensions (e.g., 100 million vertices), the partitioning process can be successfully applied to such graphs without reliance on disk scanning. In the past, any attempts to partition social networks or any network of a large magnitude resulted in failure due to the extremely large graph sizes and the resulting dependence on disk storage and access therefrom. Contrary to conventional notions and past failed attempts, the algorithms presented in the subject invention can be performed or implemented without requiring or relying on such undesirable disk scan operations—despite the massive size of the graph. The algorithms, for example, read neighbor data in a sequential manner for each vertex from the disk and then perform actions in RAM to determine upon which part (or partition) of the network each neighbor resides for the particular vertex under examination.

Put another way, the various algorithms employed to carry out the invention call for a linear scan of the vertex data stored (sequentially) on disk to merely obtain the neighbor identities for each vertex. Hence, partitioning can be accomplished without conducting arbitrary neighborhood searches on disk. Thereafter, pertinent data useful to facilitate the partitioning of the social network can be readily accessed from RAM when needed. Moreover, the partitioning of relatively large social networks to reduce or mitigate network traffic is now attainable and feasible regardless of the graph size.

To further illustrate this point, considering the following algorithm that excludes arbitrary disk scans and performs actions in RAM which only depend on the neighborhood of the vertex being examined on disk to partition a relatively large social network graph:

Imagine that there are 100 vertices in the graph and the neighbor data for each vertex is stored on disk in chronological or otherwise ordered manner:

1, 4-9-12*
2, 23-37-68*
3, 31-45-96*
... etc.
wherein:
  numbers 1, 2, and 3 are the vertex IDs (e.g., edges of graph);
  the numbers following each are the neighbor IDs; and
  the "*" signals the disk head to stop reading for any particular vertex ID.

As can be see, the adjacencies of the graph are written in a sorted manner. Now, imagine that the 100 vertices have been partitioned into 10 parts; and for each vertex, a part number between 1 and 10 is assigned to indicate at which part (e.g., server) the respective vertex is located. This assignment can be stored in RAM for each vertex. So for vertex 1, the disk reads that vertex 1 has neighbors 4, 9, and 12. In RAM, neighbors 4, 9, and 12 can be probed to determine where each neighbor resides:

neighbor 4→resides on part 7;
  neighbor 9→resides on part 7; and
  neighbor 12→resides on part 6.

Following, it can be ascertained whether vertex 1 should be moved based on the part allocations of its neighbors. Next, vertex 2 can be read from disk and then its neighbors can be probed in RAM and so on for each vertex stored on disk. Thus, there is a sufficient amount of RAM to store at least one number (partition number) for each vertex in the graph. The RAM can be readily updated as well for each vertex and/or neighbor.

More realistically, graphs of underlying social networks for the more popular or commonly used service providers comprise a mass of users in the range of 10's to 100's of millions. When relying on conventional partitioning beliefs, the corresponding graph of vertices for such extreme proportions is impossible if not impracticable to partition. The present invention, however, can successfully handle the partitioning of such graphs. By excluding disk scanning requirements and by having the capabilities to store partition numbers in RAM for each vertex or neighbor (in addition to the other aspects described hereinabove), even these massive graphs can be substantially partitioned to effectively reduce network traffic and optimize network performance.

Figure 9:
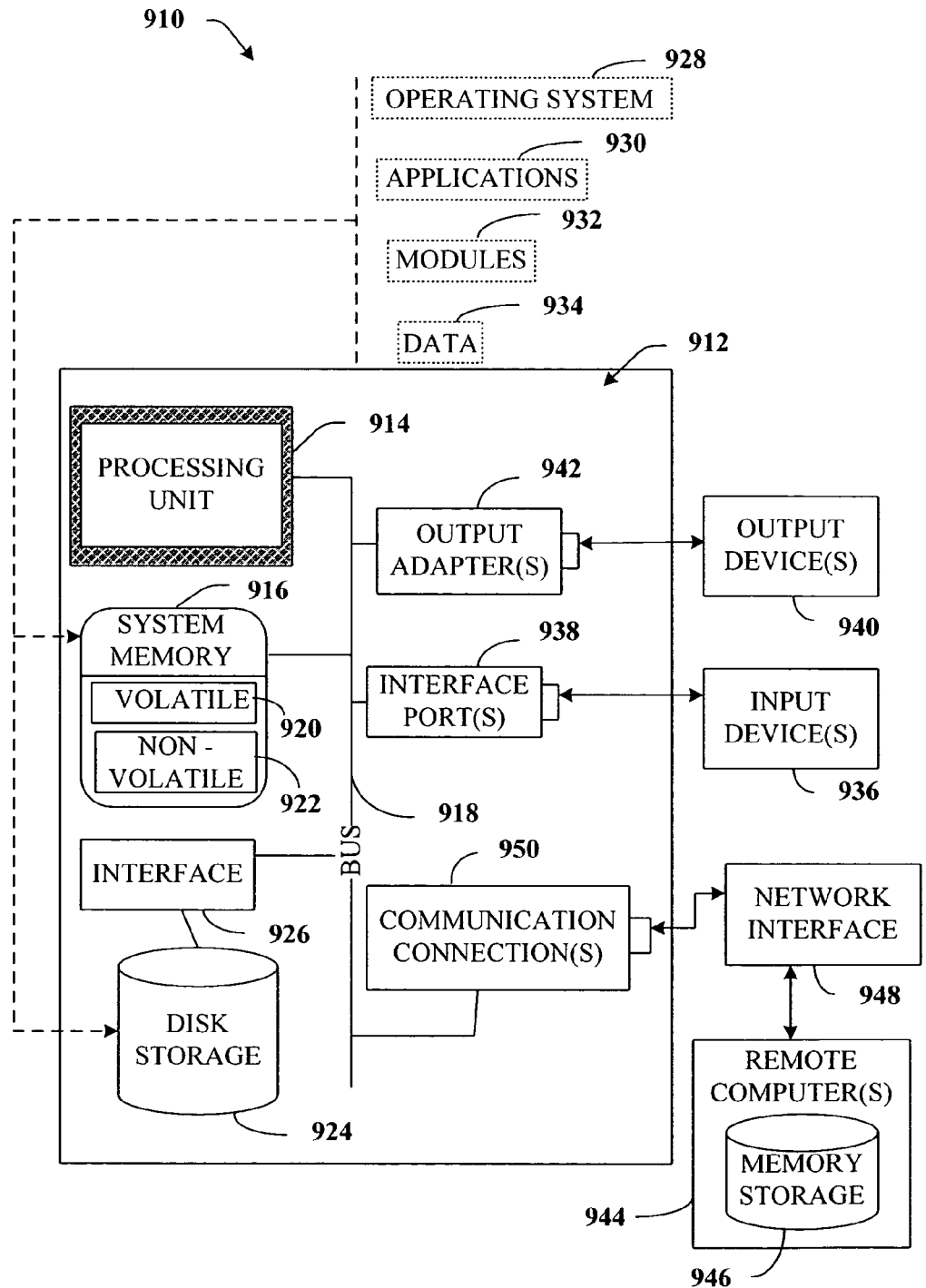
FIG. 9 illustrates an exemplary environment for implementing various aspects of the invention.

In order to provide additional context for various aspects of the present invention, FIG. 9 and the following discussion are intended to provide a brief, general description of a suitable operating environment 910 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 910 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 9, an exemplary environment 910 for implementing various aspects of the invention includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/nonremovable, volatile/nonvolatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the present invention can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/ software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates social network management, comprising:
   a memory;
   a processing unit coupled to the memory;
   a node identification component residing within the processing unit, that identifies one or more nodes associated with at least one social network that is managed by a plurality of servers;
   a clustering component residing within the processing unit, that aggregates at least a subset of nodes associated with the social network and dedicates a subset of servers to respective subsets of nodes;
   the clustering component that determines whether to move at least one node from a current server to a proposed server based at least in part upon comparing a number of connections between vertices with server size;
   "edge gain" and "size gain" are arbitrary functions of quantities e1, e2 and s1, s2, wherein e1 is a number of contacts a node has on a first cluster, e2 is a number of contacts the node has on a second cluster, s1 is the size of the first cluster—not including the node under consideration, and s2 is the size of the second cluster; and
   the clustering component determines to move the node if and only if $A*(e2-e1)>s2-s1$, wherein A is an amplification factor.

2. The system of claim 1, the node identification component further identifies one or more connections between any two nodes comprising a first node and at least a second node on the social network.

3. The system of claim 2, the clustering component further identifies one or more servers designated to the first node and the second node to determine whether to aggregate the first node and the second node on a similar server.

4. The system of claim 1, the first and second clusters map to first and second servers, respectively.

5. The system of claim 1, the clustering component that identifies a decreasing sequence of subsets of vertices, where subset q corresponds to the vertices in a q-core of the graph to facilitate determining a sequence of strata.

6. The system of claim 5, wherein the strata comprise at least one of a 1-core, 2-core, 3-core, and/or up to a k-core, wherein k is an integer greater than or equal to one.

7. The system of claim 1, further comprising a computer readable medium having stored thereon the computer executable components of claim 1 on a disk storage of a computer.

* * * * *